United States Patent [19]

Bardell

[11] Patent Number: 5,023,927
[45] Date of Patent: Jun. 11, 1991

[54] STRUCTURE TO SECURE CAST CUP CONTAINING HEATING ELEMENT TO PERCOLATOR RESERVOIR BOTTOM

[75] Inventor: Kenneth P. Bardell, West Bend, Wis.

[73] Assignee: Regal Ware, Inc., Kewaskum, Wis.

[21] Appl. No.: 425,096

[22] Filed: Oct. 23, 1989

[51] Int. Cl.$^5$ .................. A47J 27/00; A47J 31/54; F24H 1/18

[52] U.S. Cl. .................. 392/442; 392/447; 99/310; 99/313; 219/431; 219/440; 219/429

[58] Field of Search ........ 219/310, 300, 312, 429–442, 219/302; 99/307–316; 417/208–209; 392/441–442, 447, 467

[56] References Cited

U.S. PATENT DOCUMENTS 1,719,473  3/1929  Hron ............................ 99/310
3,022,411  2/1962  Soper et al. ................... 219/441
3,081,709  3/1963  Dombrowik .................... 99/310
3,858,494  1/1975  Martin .......................... 99/312

*Primary Examiner*—Bruce A. Reynolds
*Assistant Examiner*—John A. Jeffery
*Attorney, Agent, or Firm*—Wheeler Law Firm

[57] ABSTRACT

A cast cup provided with a heating element is secured to the bottom plate of a reservoir for a percolator. The cup is inserted into an opening in the bottom plate of the reservoir and has an upper flange and a lower flange. The upper flange is secured to the top surface of the bottom plate by means of swaging. The seal is watertight. The lower flange has a sealing compound applied to it and is sealed against the underside of the bottom plate when the upper flange is swaged to the top surface of the reservoir's bottom plate.

3 Claims, 1 Drawing Sheet

STRUCTURE TO SECURE CAST CUP CONTAINING HEATING ELEMENT TO PERCOLATOR RESERVOIR BOTTOM

BACKGROUND OF THE INVENTION

The device of the present invention relates to securing an otherwise conventional cast heating cup which contains the heating element to a percolator reservoir bottom. However, the invention may be used to secure other structures to different sorts of containers. By means of a unique and simple design, the applicant has invented a single piece structure which will secure a cast cup that contains a heating element to a percolator reservoir bottom.

The applicant's structure eliminates the need for using many parts, like hexagonal nuts, to attach cast cups to percolator reservoir bottoms. Further the applicant's invention allows the base to be of one piece construction.

The applicant knows of no prior art which uses the same or similar structure and functions in the same or similar manner as the applicant's invention. The closest structure to the invention of which the applicant is aware may be found in U.S. Pat. No. 1,974,676 (Hubbard). This patent merely shows a liquid well in which the water is heated having a separate lining tube which can be rolled over a bead at the inner margin of a hole in the bottom wall of the percolator; the tube and bead being formed together as described beginning about line 80 of the second column. Beginning at line 99 and continuing on the next page, the patent refers to a structure in which the interior of the well is cast rather than being a separate sleeve and is then "crimped". It does not disclose the structure of the applicant's invention. The other known reference, U.S. Pat. No. 1,719,473 (Hron), merely discloses the conventional structure which the applicant's invention replaces.

SUMMARY OF THE INVENTION

It is the objective of the applicant to reduce the number of parts that are normally necessary to secure a cast cup containing a heating element to a percolator reservoir bottom by replacing the standard interior structure with a single piece that may be easily attached to the percolator reservoir bottom.

The structure of the invention is as follows: The cup is extended through an opening in an aluminum plate which has a circumferential channel at the outer edge of the plate to receive the vertical wall of the percolator. This part of the structure is old. At the center of the plate is applicant's circular cup made of cast metal which is surrounded by a conventional heating element to heat water in the small volume of the cup and send it up the stem of the percolator which rests in the top of the cup and closes it. In the past the outer wall of this cup has been threaded so that a nut could be placed over it and screwed down to secure the cup with appropriate sealing means used underneath.

The present invention eliminates both the exterior thread on the heating cup and the nut, yet produces a connection that is very secure and economical. A round die with a central circular opening is used to downwardly deform a shoulder which is the outer portion of the circular vertical wall of the cup to either engage a large washer or to engage the reservoir bottom directly. In the preferred embodiment of the invention the circular vertical wall of the cup is downwardly deformed to engage the reservoir bottom directly.

A sealing compound is added around a channel in a lower flange before the cup is placed in the opening of the plate so that the sealing compound is in contact with the bottom surface of the plate and the die is in contact with the circular vertical outer wall of the cup above the top surface of the plate. The outer portion of the circular vertical wall of the cup is then deformed downwardly by the round die.

The round die used is part of a tool called an orbital riveter. The tool rotates the die at a high speed, with a continuous steady rolling downward stroke, around the edge of the circular vertical outer wall. This causes the outer portion of the circular vertical wall of the cup to be swaged directly onto the reservoir bottom, thereby eliminating the need of a threading operation and a large diameter nut, which is an expensive part.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The structure to secure a cast cup containing a heating element to a percolator reservoir bottom shall be referred to, for the purposes of simplicity, as the unit 10.

Figure 1:
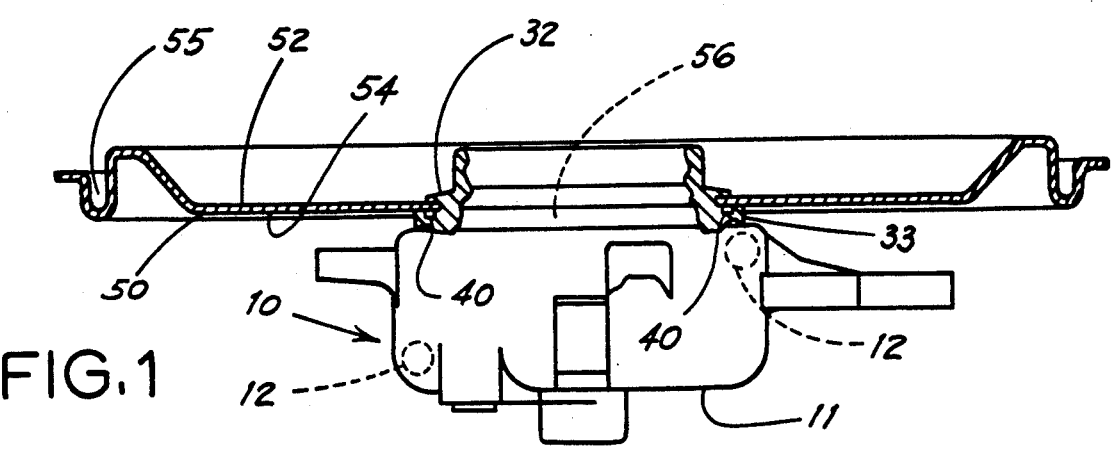
FIG. 1 is a cutaway side view of the structure to secure a cast cup containing a heating element to a percolator reservoir bottom.

The structure of the invention may be seen in FIG. 1. The unit 10 is attached to an aluminum plate 50. The aluminum plate 50 shown in FIG. 1 is the bottom or base of the percolator unit (not shown). The aluminum plate 50 has a top plate surface 52 and a bottom surface 54. Further, the plate 50 has a channel 55 at its edge to receive a vertical wall of the percolator unit and an opening 56 at its center. The plate 50 is old. As FIG. 1 shows the unit 10 is located at the center of the plate, resting in the opening 56.

The unit 10 as shown in FIG. 1. comprises a circular cast metal cup 11, a heating element, a circular vertical outer wall 30, which exists only before forming (see FIG. 2), an upper flange 32, a lower flange 33, and a channel 40. The channel 40 is part of the lower flange 33. The heating element 12 surrounds the cup 11. A conventional percolator riser tube (not shown) resting on top of the cup 11 encloses it. The heating element 12 heats water in the small volume of the cup 11 sending it up the stem of the percolator.

A sealing compound is applied to channel 40 to insure that the seal between the unit 10 and the aluminum plate 50 does not leak. The upper flange 32 is attached to the upper surface 52 of the aluminum plate 50 by means of swaging; this also acts as a seal against leakage. The lower flange 33 is attached to the bottom surface 54 by the pressure that is created when the upper flange 32 is swaged to the top surface 52. The sealing compound in channel 40 of the lower flange 33 then engages the bottom surface 54 of the plate 50.

Figure 2:
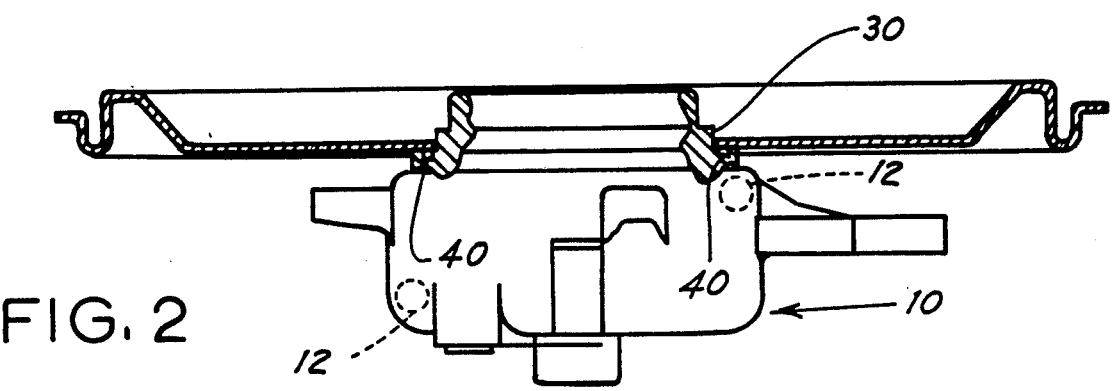
FIG. 2 is a cutaway side elevational view of the circular cup showing the outer portion of the circular vertical wall before it is swaged resulting in the structure of FIG. 1.
Figure 3:
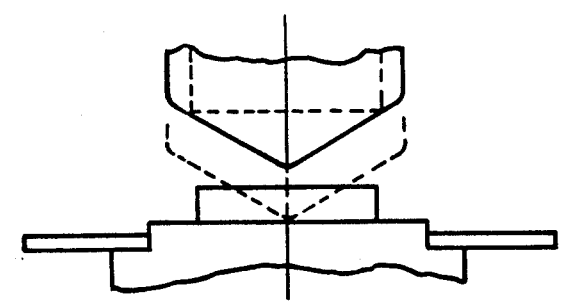
FIG. 3 is a schematic front elevational view showing the round die of the orbital riveting tool as it comes down on the the edge of the circular vertical wall of the cast cup.
Figure 4:
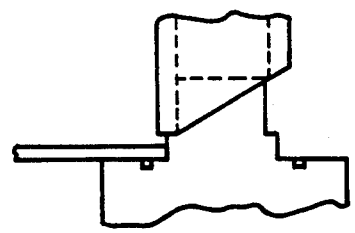
FIG. 4 is a schematic side elevational view showing the round die in relation to the edge of the circular vertical wall of the cast cup.

The structure of the unit 10 is formed as follows: The unit 10, before forming as shown in FIG. 2, is comprised of the cup 20, the circular vertical wall 30, and an outer portion 31. The unit 10 has a sealing compound applied to its groove 40. Then the unit 10 is inserted through opening 51 in aluminum plate 50 and forming begins. The aluminum plate 50 is the base of the percolator unit. An orbital riveter (not shown) is placed over the circular vertical wall 30 of the cup 20. See FIGS. 3 and 4. The end of the orbital riveter is a die 71. The orbital riveter presses the edge 72 of the die 71 against the surface of the circular vertical wall 30. The orbital riveter then rotates the die 71 at high speed, with a continuous steady rolling downward stroke on the circular vertical wall 30. The die 71 of the orbital riveter 70 begins flattening the circular vertical wall 30 and quickly and steadily moves around the circular vertical wall 30 continuously deforming the wall. The pressure from the progress of the riveter around the wall 30 is maintained until the circular vertical wall 30 shown in FIG. 2, is shaped into the flat flange 32 shown in FIG. 1. The result is that flange 32 is solidly swaged to the surface 52 of the aluminum plate 50. Once the orbital riveter 70 is done swaging it is removed and the unit 10 containing the heating element 12 is permanently fixed to the bottom surface 54 of the percolator reservoir bottom 50.

The above described embodiments of this invention are merely descriptive of its principles and are not to be limiting. The scope of this invention instead shall be determined from the scope of the following claims, including their equivalents.

What is claimed is:

1. A reservoir base plate having a top surface, a lower surface, and an opening;
    the improvement comprising;
    cup means for holding liquid having an outer wall shaped to fit closely into said opening;
    said cup means resting in said opening;
    said cup means having a circumferentially thick swageable upper wall extending above said top surface of said base plate, for securing said cup means to said base plate;
a portion of the thickness of said upper wall means being swaged into uniform tight sealing engagement with said top surface of said base plate; and said cup means also having at least one lower flange means, extending radially around said outer wall beneath said lower surface of said base plate, for securing said cup means to said lower surface of said base plate.

2. The device of claim 1 in which said lower flange means has sealing means for sealing;
    said sealing means being located between said lower flange and said lower surface.

3. The device of claim 1 in which said cup means is a cup containing a heating element.

* * * * *